Feb. 12, 1924.
L. J. ARCHAMBAULT
1,483,266
APPARATUS FOR CLARIFYING LIQUIDS
Filed Dec. 4, 1922
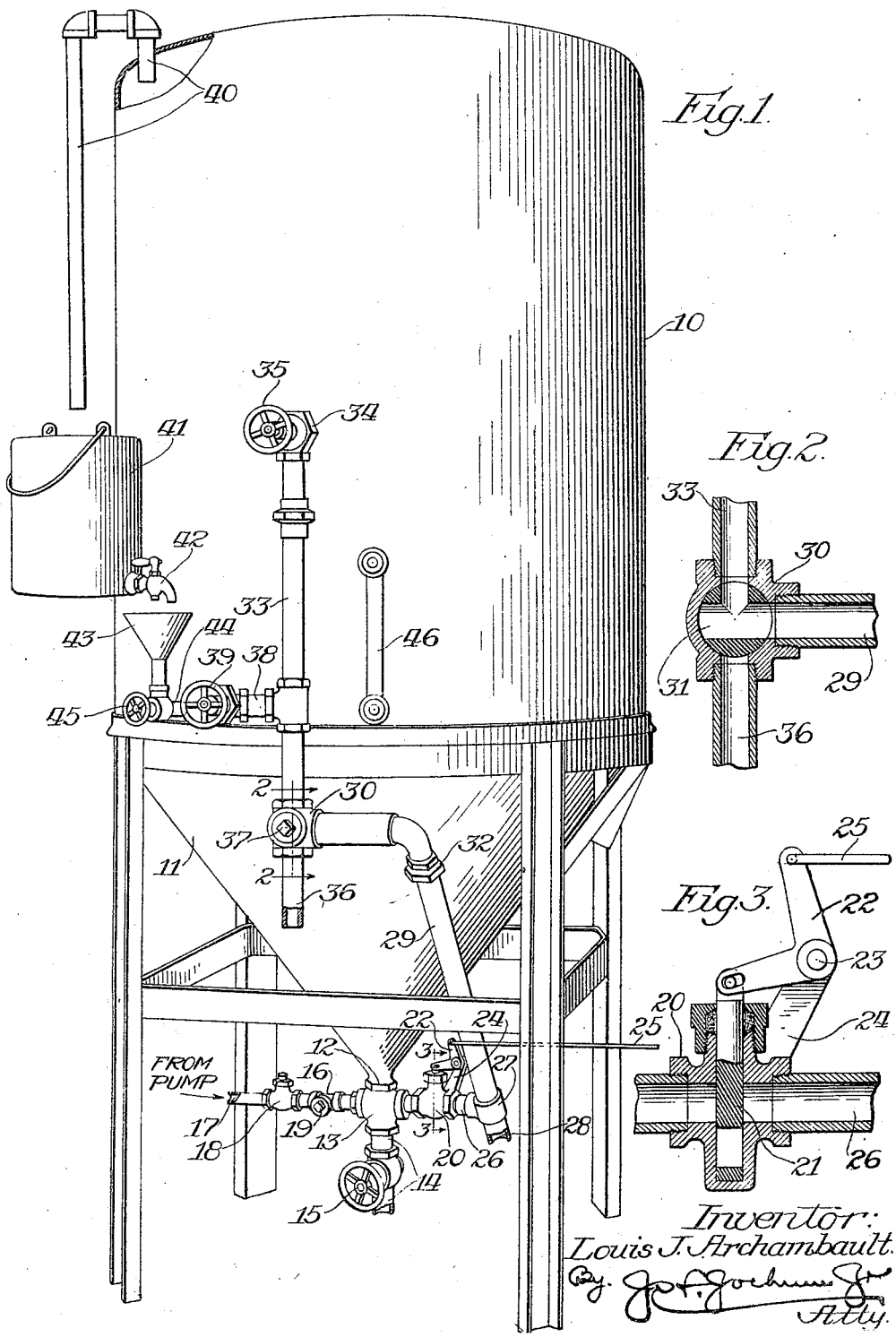
Inventor:
Louis J. Archambault.

Patented Feb. 12, 1924.

1,483,266

UNITED STATES PATENT OFFICE.

LOUIS J. ARCHAMBAULT, OF CHICAGO, ILLINOIS.

APPARATUS FOR CLARIFYING LIQUIDS.

Application filed December 4, 1922. Serial No. 604,960.

*To all whom it may concern:*

Be it known that I, LOUIS J. ARCHAMBAULT, a citizen of the United States, residing at Chicago, in the county of Cook and State of Illinois, have invented certain new and useful Improvements in Apparatus for Clarifying Liquids, of which the following is a specification.

This invention relates to improvements in apparatus for clarifying liquids such as gasoline, naphtha, benzine, and other liquids of a specific gravity less than water, and which liquids are used in the cleaning of textiles and clothing, and in which apparatus a clarifying agent such as water, solutions of soda ash or caustic soda in water, or other liquids substantially heavier than liquids to be clarified are used, and one of the objects of the invention is to provide an improved, simple, compact and efficient apparatus of this character.

A further object is to provide improved means whereby the apparatus may be readily and quickly emptied of its contents in case of emergency or when desired.

To the attainment of these ends and the accomplishment of other new and useful objects as will appear, the invention consists in the features of novelty in substantially the construction, combination and arrangement of the several parts, hereinafter more fully described and claimed and shown in the accompanying drawing illustrating this invention, and in which—

Figure 1 is a view in elevation of the apparatus.

Figure 2 is an enlarged detail sectional view taken on line 2—2, Figure 1.

Figure 3 is an enlarged detail sectional view taken on line 3—3, Figure 1.

Referring more particularly to the drawing the numeral 10 designates generally a closed tank of any desired size and configuration and constructed of any suitable material but is preferably cylindrical in cross section and is provided with a conical bottom 11, having an outlet opening at the apex 12 of the bottom.

Connected with the outlet 12 is a T coupling 13 and connected with one branch of the coupling is an outlet pipe 14 controlled by a suitable valve 15, and which valve when open will permit the contents of the tank 10 to be discharged through the pipe 14.

Connected to another branch of the coupling 13 is a T coupling 16 and which coupling is also connected with a supply pipe 17, and through which pipe the liquid to be clarified is delivered into the tank through the opening 12 in the bottom thereof.

A check valve 18 is provided in the pipe 17 to prevent the liquid from flowing back to the pump.

The T coupling is provided with a removable closure 19 for the other branch thereof and which closure is adapted to be removed so that a pipe may be connected to the coupling for the purpose of discharging steam or vapor into the tank through the coupling 13 for the purpose of heating the contents of the tank when desired or for agitating the contents and for cleaning the interior of the tank.

Connected with the other branch of the T coupling 13 is a quick operating valve 20 such as a gate valve provided with a gate 21 therein and the gate is adapted to be operated in any suitable manner such as by means of a bell crank lever 22, pivotally supported as at 23 upon a suitable fulcrum 24. One arm of the bell crank is connected with the gate 21 and to the other arm of the bell crank may be connected a wire, cable, or other element 25, which leads to a point remote from the tank so that in case of emergency and by pulling upon the wire or cable 25 the valve 21 may be readily shifted so as to establish communication between the coupling and the discharge outlet pipe 26, which leads from the other side of the casing of the valve 20.

Connected with the outlet pipe 26 is a T coupling 27, one branch of which has connected with it a discharge outlet pipe 28, which leads to any suitable point such as an underground tank or to any other point to which it is desired to convey the liquid from the tank. Connected with the other branch of the coupling 27 is a pipe 29, which in turn is connected with a casing 30 of a three-way valve 31, suitable connecting means such as a coupling 32, being provided for the purpose, which will permit the pipe 29 to be readily detached when desired.

A pipe 33 is connected with the valve casing 30 and has communication with the tank 10 at any desired elevation as at 34, and this communication is controlled by a valve 35, which latter when opened will permit the liquid in the tank to flow through a pipe 33 and thence into the pipe 29 when the three-way valve 31 is set to establish communication between the pipes 33 and 29. When, however, the three-way valve is set to cut off communication between the pipes 33 and 29, it will establish communication between the pipe 33 and a discharge outlet pipe 36 on the other side of the valve casing 30 to permit the liquid from the tank to be discharged through the pipe 36 for sampling purposes. The valve 33 may be operated in any suitable manner such as by means of an angular projection 37 adapted to receive a suitable tool or implement for rotating the valve.

Leading from the pipe 33 and above the valve casing 30 is a branch pipe 38 which also has communication with the tank 10 at a point considerably below the point 34, at which the pipe 33 communicates with the interior of the tank. This branch 38 is controlled by a suitable valve 39 and is adapted to withdraw liquid from the tank to permit it to flow into the pipe 33 and out of the discharge outlet 36, when desired.

The tank 10 is provided with an overflow pipe 40 leading from the top thereof and a receptacle 41 may be supported in any suitable manner by the tank 10, and into which receptacle the pipe 40 discharges.

The receptacle is provided with a draw off cock 42 adapted to discharge into a funnel shaped receptacle 43, which has communication with a pipe 44, the latter being in communication with the interior of the tank 10 at a point adjacent its base, and the pipe 44 is controlled by a suitable valve 45. With this construction and when the valve 45 is opened the contents of the receptacle 41 may be discharged into the funnel shaped receptacle 43 to be delivered into the tank 10.

If desired a sight glass 46 may be provided for the tank.

The clarifying agent is supplied to the tank from the receptacle 41 and the receptacle is of any desired size to contain a predetermined amount of the clarifying agent and may be of such a size as to serve as a gauge or indicator as to the amount of clarifying liquid to be supplied to the tank.

When the clarifying agent is placed within the receptacle 41 the valve 45 is opened, all of the other valves being closed. As soon as the desired amount of clarifying agent has been thus delivered into the tank 10 the valve 45 is then closed. The pump is then operated to supply the benzine or gasoline which is to be clarified through the pipe 17, past the check valve 18 and into the tank 10, through the opening 12 in the conical bottom 11. Should the supply of liquid to be cleaned be continued until the tank is filled, the liquid will overflow through the pipe 40 and be delivered into the receptacle 41. As soon as the liquid is delivered to the receptacle 41, the supply of liquid is then shut off.

As soon as the liquid has been allowed to stand for a predetermined period and in order to test the liquid in the tank, the valve 31 is operated so as to cut off communication between the pipe 33 and the pipe 29 and establish communication between the pipe 33 and the pipe 36. The valve 35 is then opened to withdraw some of the liquid from that point and which liquid will be discharged through the pipe 36 into a suitable receptacle. If the liquid is clear at that point, the valve 35 may be closed and the valve 39 opened to ascertain whether or not the liquid is clear at a lower point. The valve 39 is then closed.

The liquid may be drawn off from the tank 10 by positioning the valve 31 to establish communication between the pipe 33 and the pipe 29 which communicates with the pipe 28 leading to any suitable source. The valve 35 is then opened and the liquid is allowed to run off of the tank until the liquid level is below the communication 34 of the casing of the valve 35 with the tank.

The valve 39 may then be opened to establish communication between the pipe 33 and the pipe 29 to draw off more of the liquid from the tank.

After the liquid has been removed to the level of the valve 39, the latter is closed and the valve 15 may, if desired, be opened so as to permit the accumulation in the conical bottom 11 to be discharged through the pipe 14.

In the event that it is desired to heat the contents of the tank the closure 19 may be removed from the coupling 16 and a steam pipe connected therewith. If desired any suitable fluid may be supplied through the opening from which the closure 19 has been removed for agitating or cleaning out the inside of the tank.

In the event of emergency and when it is desired to quickly remove the contents of the tank 10 so as to prevent damage or for any other reason, the gate valve 21 may be opened and this valve when opened will establish communication with the inside of the tank through the opening 12 in the bottom thereof, valve casing 20 and pipe 26 which communicates with the discharge pipe 28.

Obviously the valves which are employed in this construction may be of the ordinary and well known type, suitable for the purpose.

What is claimed as new is:—

1. An apparatus for clarifying liquids embodying a container having a conical bottom provided with an outlet at the lowest point of said bottom, a discharge conduit connected with said outlet, a valve for controlling the outlet, means for supplying to the tank a clarifying solution, a draw off pipe for the tank having a plurality of communications with the tank at different levels, valves individual to such communications for controlling them, a discharge pipe communicating with the said draw off pipe at a point spaced from the delivery end of the said draw off pipe, a three way valve at the junction of the discharge and draw off pipes, means establishing direct communication between the first recited outlet and the said discharge pipe, and means for controlling the last recited means.

2. An apparatus for clarifying liquids embodying a container having a conical bottom provided with an outlet at the lowest point of said bottom, a discharge conduit connected with said outlet, a valve for controlling the outlet, means for supplying to the tank a clarifying solution, a draw off pipe for the tank having a plurality of communications with the tank at different levels, valves individual to such communications for controlling them, a discharge pipe communicating with the said draw off pipe at a point spaced from the delivery end of the said draw off pipe, a three way valve at the junction of the discharge and draw off pipes, means establishing direct communication between the first recited outlet and the said discharge pipe, and a quick acting valve controlling the last recited means whereby the contents of the tank may be quickly removed.

3. An apparatus for clarifying liquids embodying a container having a conical bottom provided with an outlet at the lowest point of said bottom, a discharge conduit connected with said outlet, a valve for controlling the outlet, means for supplying to the tank a clarifying solution, a draw off pipe for the tank having a plurality of communications with the tank at different levels, valves individual to such communications for controlling them, a discharge pipe communicating with the said draw off pipe at a point spaced from the delivery end of the said draw off pipe, a three way valve at the junction of the discharge and draw off pipes, means establishing direct communication between the first recited outlet and the said discharge pipe, means for controlling the last recited means, and means for supplying to the tank through the first recited outlet the liquid to be clarified.

4. An apparatus for clarifying liquids embodying a container having a conical bottom provided with an outlet at the lowest point of said bottom, a discharge conduit connected with said outlet, a valve for controlling the outlet, means for supplying to the tank a clarifying solution, a draw off pipe for the tank having a plurality of communications with the tank at different levels, valves individual to such communications for controlling them, a discharge pipe communicating with the said draw off pipe at a point spaced from the delivery end of the said draw off pipe, a three way valve at the junction of the discharge and draw off pipes, means establishing direct communication between the first recited outlet and the said discharge pipe, means for controlling the last recited means, a supply pipe communicating with the first said outlet for supplying to the tank the liquid to be clarified, a check valve in said pipe, and means whereby a heating fluid may be supplied to the interior of the tank through the said supply pipe and the first recited outlet opening.

5. An apparatus for clarifying liquids embodying a container having a conical bottom and provided with an outlet opening at the lowest point of said bottom, an outlet passage communicating with and leading from said outlet, a valve for controlling said passage, an inlet pipe communicating with the passage, a second outlet passage communicating with the first recited outlet passage, a valve for controlling the second recited outlet passage, a delivery pipe communicating with the tank and having communication with the second recited outlet passage, and means for controlling the said delivery pipe, the last recited valve being disposed between the outlet of the tank and the point of connection between the two said outlet pipes.

6. An apparatus for clarifying liquids embodying a container having a conical bottom and provided with an outlet opening at the lowest point of said bottom, an outlet passage communicating with and leading from said outlet, a valve for controlling said passage, an inlet pipe communicating with the passage, a second outlet passage communicating with the first recited outlet passage, a valve for controlling the second recited outlet passage, a delivery pipe communicating with the tank and having communication with the second recited outlet passage, means for controlling the said delivery pipe, the last recited valve being disposed between the outlet of the tank and the point of connection between the two said outlet pipes, and means whereby heated vapor may be delivered into the said inlet pipe to be discharged into the tank.

In testimony whereof I have signed my name to this specification, on this 23rd day of November, A. D. 1922.

LOUIS J. ARCHAMBAULT.